United States Patent Office 2,751,336
Patented June 19, 1956

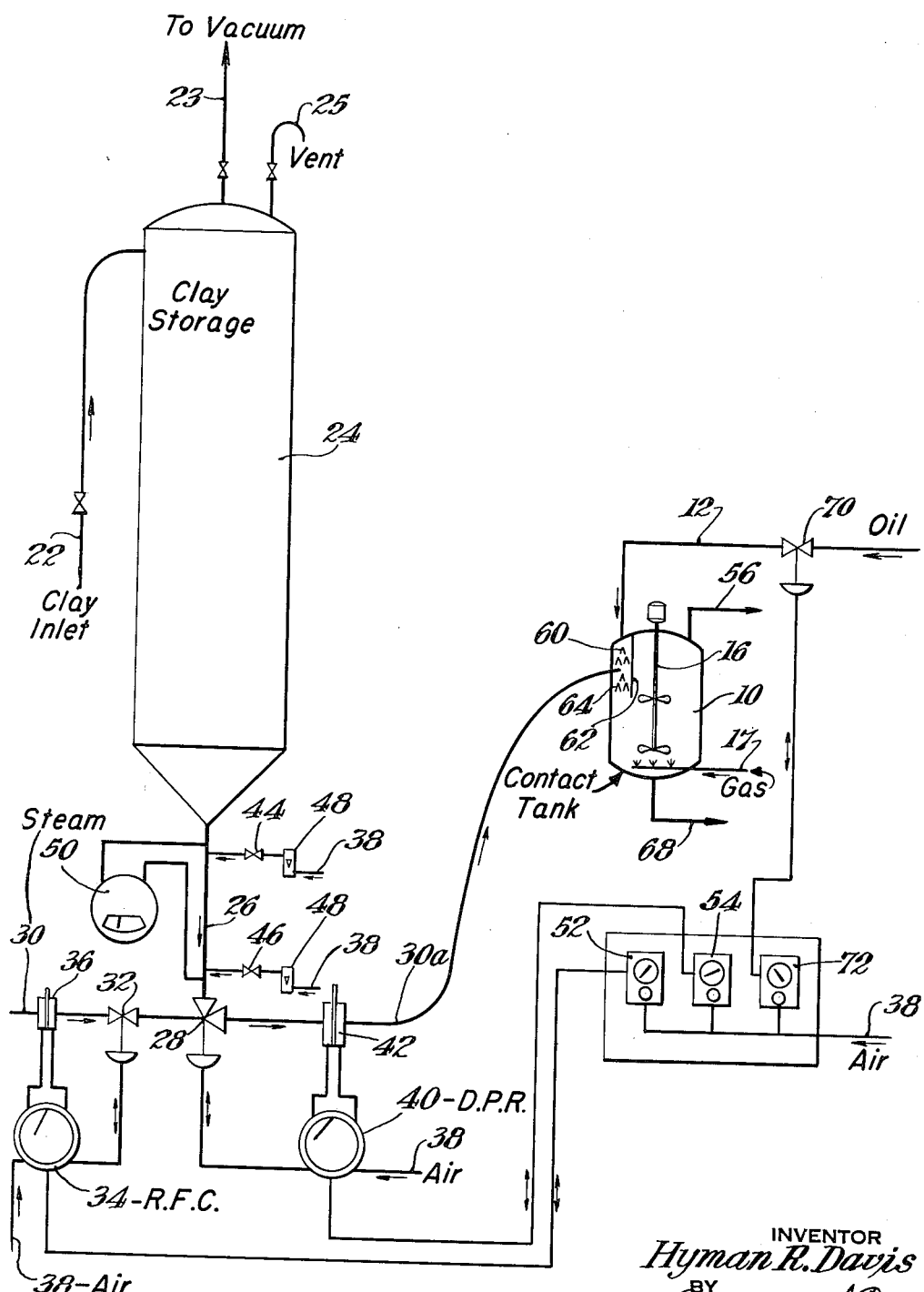

2,751,336

CLAY CONTACTING OF LUBRICATING OIL

Hyman R. Davis, Jackson Heights, N. Y., assignor to The Lummus Company, New York, N. Y., a corporation of Delaware Application March 21, 1951, Serial No. 216,749

2 Claims. (Cl. 196—147)

This invention relates to improvements in clay contacting of lubricating and similar oils and is more particularly an improvement on the invention disclosed in copending application, Serial No. 58,326, filed November 4, 1948, now Patent No. 2,651,602, issued September 8, 1953, of which I am one of the inventors, and my copending application 124,929 filed November 1, 1949, now Patent No. 2,594,880, issued April 29, 1952.

As is well known in the refining industry, various physical and chemical reactions are carried out in the presence of solid comminuted refining agents which are of natural or synthetic origin and which may depend upon the absorptive, or adsorptive or catalytic or chemical characteristics of the refining agent. For the purpose of this invention these materials are comminuted, generally hard, and usually abrasive particles and are brought into contact with the liquids to be refined in controlled quantities and usually under temperature and pressure conditions for predetermined time periods. My invention is applicable, generally, to the handling of refining agents of this type including catalysts such as aluminum chloride, or filtering agents, as well as the specific embodiment herein disclosed which relates to clay contacting.

For the purpose of this disclosure, "clay" is used in its commercial sense to cover the various hydrous aluminum silicates as well as those related materials such as treated montmorillonite, fuller's earth, bauxite and other natural and treated solid materials.

Specifically referring to the clay contacting of lubricating oils for example, it is customary to first mix measured quantities of clay in a slurry formed with a measured part of the oil and then pump the clay slurry to a contact tank into which the main body of oil is introduced. These slurry pumps, due to the abrasive nature of the clay, have a very short life, and other methods of handling such as bucket hoists, elevators, belt and screw conveyors, gravimetric feeds, star valves and other and similar devices, have similar operating complications. These complications are aggravated where precise measurement of the solid material is necessary as is the case with the clay contacting of lubricating oil where the clay costs are very, very high.

The principal object of my present invention is to simplify the handling and metering of solid comminuted materials avoiding all short lived mechanical handling equipment.

A more specific object of the invention is to provide an improved and simplified clay contact plant for the purification of lubricating oil in which the clay is conveyed and metered with the aid of steam to avoid all corrosive and explosive conditions, and whereby accuracies of delivery in proportion to changes in controls can be maintained within less than five percent.

Further objects and advantages of my invention will appear from the following description of a preferred form of embodiment thereof taken in connection with the attached drawing which is illustrative thereof, the figure representing a schematic view of certain relevant equipment in a clay contacting plant.

The plant particularly referred to on the attached drawing, is primarily adapted to treat lubricating oil at an intermediate stage in its production for the general purpose of decolorizing, neutralizing, and stabilizing the oil. This operation is carried out in the contact or time tank 10 to which the coil is directly charged through the line 12 under control of valve 70. The tank 10 is provided with a suitable motor driven mixer, generally indicated at 16, which may be horizontal or vertical, as desired. It may also be provided with a gas jet at 17 for introduction of inert gas, or steam under sufficient pressure to aid agitation of the mass and to remove light ends of the oil.

In accordance with my present invention, the clay which is normally available in bulk shipments as in a railroad car, may be removed through the line 22 by the application of a vacuum at 23 to storage bin 24. This tank is normally provided with a vent at 25 so that the clay may be removed by gravity through discharge leg 26. This leg is interconnected at valve 28 with transfer line 30 which is supplied with conveying steam for the specific reasons hereinafter described. The steam is controlled by diaphragm valve 32 through a recording flow control 34 which is interconnected with a typical orifice 36 and supplied in turn with the usual refinery compressed air through the line 38.

The valve 28 is also of a diaphragm operated type of the needle or gate construction. It is actuated from the differential pressure recorder 40 which is influenced by an orifice 42 in the upstream portion 30a of line 30. This recorder is also supplied with the suitable constant pressure air supply 38 or equivalent.

In order to establish a constant density clay head at the valve 28, the discharge leg 26 from the storage bin 24 is suitably aerated at the upper and lower portions thereof from the refinery air line 38 and under control of valves 44 and 46 and rotameters 48. A differential pressure indicator 50 may be used to show the changes of density of the clay mass in the discharge leg 26 and to aid in establishing the desired constant density. It is to be understood that the line 26 is of such length (approximately 15 feet), that the fluctuations of clay level in bin 24 will not materially affect the clay density at valve 28.

I have found that with the flow controls indicated, I can establish a uniform steam supply for the clay flow by means of control member 52, and by means of the control 54, appropriate adjustment of the flow control valve 28 can be accomplished so that I can obtain a uniform proportioned discharge of clay into tank 10 within an error of less than 5% of the desired amount. Generally, the range of clay requirements per barrel of oil will run from three to thirty-five pounds.

In the normal handling of unheated clay which has as high as 15% moisture, there is a tendency of foaming due to the initial contact with the hot oil normally introduced at a preferred temperature of from 300° F. to 650° F. For this reason I prefer to introduce the clay to a separate inlet header chamber 60 which may be formed by an internal baffle 62 depending from the upper part of the tank 10, such chamber being provided with a plurality of flow interrupting baffles 64. By introducing the clay at an intermediate part of such zone or header, the clay is very finely divided as it falls by gravity and thus presents a very large contact area with the baffles causing a relatively uniform distribution of the clay over the entire cross section of the chamber 60.

As the fluidized clay flows downward in chamber 60, it is thoroughly wetted and contacted with the oil entering from the oil line 12 and as the clay is repeatedly interrupted in its flow by the various baffles 64, it is repeatedly wetted and contacted.

During this wetting and contacting operation, the hot oil heats the clay thereby vaporizing the water therein which passes off as vapor through the discharge line 56. Efficient heat and material transfer between the oil and fluidized clay will result in a stream of vapor substantially stripped of clay and a completely mixed slurry of oil and clay. It is found that there is no foaming and a very intimate slurry mixture without mechanical mixing is thus obtained before the clay reaches the main body of oil in the lower part of the contact tank 10.

The mixing level within the tank 10 is maintained by suitable level controls, not shown, and the clay slurry is drawn off through the line 68 and passes to the filter in the usual manner.

The oil control valve 70 which is also of a diaphragm type may be operated by a flow control 72 to provide a constant flow at any desired rate. By establishing a uniform steam flow (control 52) and a predetermined valve opening at 28 by control 54, I can obtain a proportioned contact of any desired extent with completely uniform results (within an error of less than 5%) by merely varying the oil control 72.

The particular advantage of such an operation is not only in its simplicity and lack of maintenance, but primarily results from the elimination of slurry and weighing tanks and pumps which continuously wear out and are expensive to replace. On an operation which normally produces as much as 75,000 gallons of finished lubricating oil a day, it is estimated that the saving on the initial equipment cost is in excess of $75,000.

The particular importance of the steam as the conveying fluid will be appreciated. The steam is not only an ideal, inexpensive fluidizing medium, being available at low pressure, and generally available at all refineries, but it has the advantage of being hot and inert. By jacketing lines 26 and 30a, a substantial temperature increase of the clay is obtained from the time it leaves the bulk storage bin 24 until it reaches the hot contact tank 10. Within the tank 10, water vapor is of course formed by the further heating of the clay and provision has to be made in any event for removal of vapors and their condensation. As a result, the steam adds no further equipment; and, as compared to other suggestions, it eliminates gas holders, compressors, corrosive actions or explosive conditions, as would be the case if recirculated inert gas or air were employed in line 30. It is preferably superheated to avoid any substantial condensation in the carrying line which might cause "mudding."

While I have shown and described a preferred form of embodiment of my invention, I am aware that modifications may be made thereto, and I therefore desire a broad interpretation of the invention within the scope and spirit of the description herein and of the claims appended hereinafter.

I claim:

1. In the process of continuously refining lubricating oil by contacting with clay wherein quantities of clay precisely measured with respect to the oil are delivered to a contacting tank at controllable rates and wherein the clay is stored in bulk in a vented storage bin from which the clay is removed by gravity, the improvement which comprises passing the clay from said storage bin to said contacting tank through a discharge leg and a transfer line, said discharge leg connected at its upper end to said storage bin and at its lower end to said transfer line, maintaining a constant density of clay in said discharge leg irrespective of fluctuations in the level of clay in said storage bin by introducing air into said leg in a quantity at least sufficient to aerate the clay, the amount of which air is controlled with respect to the differential pressure between two preselected points at different levels in the discharge leg, introducing steam to the end of the transfer line remote from the contacting tank to convey said clay through said transfer line, maintaining a uniform steam supply in the transfer line and controlling the rate of clay flow through said line within an error of less than 5 per cent of the desired amount by passing the clay in said line through an orifice influencing differential pressure responsive means controlling the rate of clay flow into said transfer line.

2. In the process of continuously refining lubricating oil by contacting with clay wherein quantities of clay precisely measured with respect to the oil are delivered to a contacting tank at controllable rates and wherein the clay is stored in bulk in a vented storage bin from which the clay is removed by gravity, the improvement which comprises passing the clay from said storage bin to said contacting tank through a discharge leg extending downwardly from the bottom of said storage bin and connected at its lower end with a transfer line, and thence through said transfer line to said contacting tank, maintaining a constant density of clay in said discharge leg irrespective of fluctuations in the level of clay in the storage bin by introducing air into said leg in a quantity at least sufficient to aerate the clay, the amount of which air is controlled with respect to the differential pressure between two preselected points at different levels in the discharge leg, introducing steam to the end of the transfer line remote from the contacting tank to convey said clay through said transfer line, maintaining a uniform steam supply in the transfer line and controlling the rate of clay flow through said line within an error of less than 5 per cent of the desired amount by passing the clay in said line through an orifice connected with differential pressure responsive means controlling the rate of clay flow into said transfer line.

References Cited in the file of this patent

UNITED STATES PATENTS

| Number | Name | Date |
|---|---|---|
| 1,797,513 | Osterstrom et al. | Mar. 24, 1931 |
| 1,930,597 | Osterstrom et al. | Oct. 17, 1933 |
| 2,327,175 | Conn | Aug. 17, 1943 |
| 2,424,147 | Campbell | July 15, 1947 |
| 2,440,623 | Voorhees | Apr. 27, 1948 |
| 2,472,459 | Banks | June 7, 1949 |
| 2,601,676 | Trainer et al. | June 24, 1952 |
| 2,641,574 | Arthurs | June 9, 1953 |
| 2,651,602 | Davis et al. | Sept. 8, 1953 |

OTHER REFERENCES

Albright et al.: "Pneumatic Feeder for Finely Divided Solids," Chem. Engineering, June 1949, pp. 108–111.